United States Patent Office 3,833,677
Patented Sept. 3, 1974

3,833,677
PROCESS FOR THE PREPARATION OF SUBSTITUTED AROMATIC COMPOUNDS
Charles Grard, Lyon, France, assignor to Rhone-Poulenc S.A., Paris, France
No Drawing. Filed Feb. 25, 1970, Ser. No. 14,222
Claims priority, application France, Feb. 27, 1969, 6905185
Int. Cl. C07c 15/00
U.S. Cl. 260—668 R                11 Claims

ABSTRACT OF THE DISCLOSURE

Friedel-Crafts-type condensation may be effected by utilising, as catalyst, a derivative of ruthenium, rhodium, osmium, or iridium, particularly a halide or halonitrile complex, which catalyst may be used in conjunction with a Brönsted acid catalyst.

---

The present invention provides a process for the preparation of aromatic compounds whose aromatic nuclei are substituted by organic residues.

A convenient method for the preparation of such aromatic compounds consists in replacing one or more hydrogen atoms of the aromatic nucleus by the said organic residue which is derived from a compound containing the residue combined with one or more reactive functional groups, particularly halogen or hydroxyl. This class of reaction is known as a Friedel-Crafts condensation. Examples of such condensations include alkylations and acylations of aromatic compounds. To alkylate aromatic compounds, reagents such as aliphatic halides, alkenes, alkynes or alcohols may be employed. To acylate aromatic compounds, reagents such as acid chlorides, acid anhydrides, esters or carboxylic acids may be employed. The aforementioned reactions of aromatic compounds are of considerable industrial value because of the large number of products which may be obtained from them. For example, acylation of aromatic compounds allows aromatic ketones and aldehydes (using, in this case, for example CO and HCl) such as acetophenone, propiophenone and α-chloracetophenone to be prepared.

To carry out the alkylation and acylation of aromatic compounds by Friedel-Crafts condensation, acid catalysts are employed. Either Brönsted acids, such as HF, HCl, $H_2SO_4$ or $H_3PO_4$ or Lewis acids, such as metal or boron halides may be used. The metal halides are those of metals in most groups of the periodic classification, but the aluminium halides, such as aluminium chloride or aluminium bromide, are most used. $BeCl_2$, $CdCl_2$, $ZnCl_2$, $CrCl_3$, $TiCl_4$, $ZnCl_4$, $SnCl_4$ and $FeCl_3$ are other metal halides which can be used in the Friedel-Crafts condensation. However, the halides of the noble metals of group VIII of the periodic classification have never hitherto been used as catalyst in this condensation.

According to the present invention, there is provided a process for the preparation of an aromatic compound substituted by a substituted or unsubstituted, aliphatic, cycloaliphatic or araliphatic hydrocarbyl radical or an acyl radical which comprises reacting an aromatic compound containing at least one hydrogen atom attached to an aromatic nucleus with a substituted or unsubstituted, aliphatic, cycloaliphatic, or araliphatic halide or alcohol, an acyl halide, or an acid anhydride in the presence of, as catalyst, a ruthenium, rhodium, osmium, or iridium compound.

More particularly, the present invention provides a process for the preparation of an aromatic compound of the general formula:

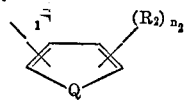

in which Q represents a —CH=CH—, —CH=N—, —NH—, —S—, or —O— group; $n_1$ is a whole number from 1 to 6 and $n_2$ is 0 or a whole number from 1 to 5 ($n_1$ not being greater than the total number of carbon atoms in the aromatic ring and $n_2$ being lower than the total number of carbon atoms in the aromatic ring); $R_1$ represents an aliphatic, cycloaliphatic or araliphatic hydrocarbyl radical or an acyl radical each of which may be substituted by halogen (e.g. chlorine or bromine), or a functional group such as nitrile, amino, nitro, nitroso, amide, aldehyde, ketone, ester, ether, or a heterocyclic radical; $R_2$ represents a radical which may be identical with $R_1$ or may be aryl, chlorine, bromine, hydroxyl, nitrile, nitro, nitroso, aldehyde, ether, or amine, or a hydrocarbon chain, which may be interrupted by one or more hetero atoms, forming a benzene or heterocyclic nucleus with two adjacent carbon atoms of the substituted nucleus; and when $n_2$ is greater than 1 the several $R_2$ radicals may be identical or different, which comprises reacting a compound of the general formula:

$R_1$—X; or
$R_1$—OH ($R_1$ not being acyl); or
$(R_1)_2O$ ($R_1$ being acyl)

in which X represents halogen and $R_1$ is as defined above, with an aromatic compound of the general formula:

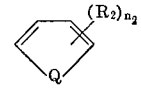

in which $n_2$, Q and $R_2$ are as defined above.

More specifically, $R_1$ may be alkyl of 1 to 10 carbon atoms, such as methyl, ethyl, propyl, isopropyl, n-butyl, sec-butyl, tert-butyl; aralkyl of 7 to 20 carbon atoms, such as benzyl, phenylethyl, naphthylmethyl, piperonyl; alkenyl of 2 to 10 carbon atoms, such as vinyl, allyl, propenyl, butenyl; cyclohexyl or cyclohexenyl; hydroxyalkyl, such as hydroxyethyl, hydroxypropyl, hydroxybutyl; alkoxy-, cycloalkoxy-, cycloalkenyloxy- or arylox-alkol, such as ethoxyethyl, propoxyethyl, vinyloxyethyl, allyloxyethyl; acyl, such as acetyl, propionyl, butyryl, acrylyl, methacrylyl, benzoyl, toluyl. $R_2$ may, in addition to the above-mentioned radicals, be alkoxy, such as methoxy, propoxy, ethoxy; cycloalkoxy, such as cyclohexyloxy; aryloxy, such as phenoxy; alkenyloxy, such as allyloxy; or aryl, such as phenyl.

As the substituting compound of formula $R_1$—X, $R_1$—OH or $(R_1)_2O$ substituted or unsubstituted aliphatic, cycloaliphatic or araliphatic chlorides or bromides, such as methyl, ethyl, propyl, isopropyl, sec-butyl, tert-butyl, cyclohexyl, benzyl chloride or bromide, bis-(chloromethyl) benzene, ethoxyethyl chloride, allyloxyethyl chloride, phenoxyethyl chloride, allyl chloride, propenyl chloride, methallyl chloride, piperonyl chloride, chloro- and bromo-methylnaphthalene; substituted or unsubstituted aliphatic, cycloaliphatic or araliphatic primary or secondary alcohols, such as ethanol, propanol, cyclohexanol, benzyl alcohol, β-phenylethyl alcohol, methoxyethanol, ethoxyethanol, or allyloxyethanol; acyl halides such as acetyl, propionyl, butyryl, acrylyl, methacrylyl, benzoyl, toluyl, chlorides and bromides; and acid anhydrides such as acetic, propionic and benzoic anhydrides, may be used.

As the aromatic compound to be substituted benzene, toluene, ethylbenzene, xylenes, isopropylbenzene, allylbenzene, trimethylbenzenes, naphthalene, biphenyl; phenols such as phenol, cresols, pyrocatechol, alkoxyphenols, such as guaiacol, guaiethol; phenol ethers such as anisole, phenetole, trimethoxybenzenes, dimethoxybenzenes, allyloxybenzene, 1,2-methylenedioxybenzene; and aldehydes, such as benzaldehydes, may be used.

Besides obtaining benzenoid aromatic compounds, the process also applies to the introduction of $R_1$ groups into heterocyclic aromatic compounds, such as thiophene.

As examples of catalysts, halides of Ru, Rh, Os and Ir, such as $RuCl_3$, $RhCl_3$, $OsCl_3$, $IrCl_3$, $RuBr_3$, $RhBr_3$, $OsBr_3$, $IrBr_3$ and $RuI_3$ in the anhydrous or hydrated form are preferably used. It is also possible to employ halogenated complexes of these metals obtained from a metal halide and a monodentate or polydentate ligand, for example, those described in French Pat. 1,505,334 and its addition No. 91,167. More particularly, the following nitrilo complexes: dichloro-tetrakis(acrylonitrilo)ruthenium, dichloro-tetrakis(methacrylonitrilo)ruthenium, diiodo-tetrakis-(acrylonitrilo)ruthenium, dichloro-tetrakis(benzonitrilo)ruthenium and trichloro-tris(acetonitrilo)ruthenium may be used.

The amount of catalyst, expressed in mols of metal compound per mol of substituting compound may vary within wide limits. Generally, an amount of between $10^{-4}$ and $5 \times 10^{-1}$ mol of metal derivative per mol of substituting compound is very suitable, but it is possible to use higher ratios, for example equal to 1 or greater than 1.

The catalyst may be used by itself or be deposited on a carrier such as those generally employed in catalysis (alumina, silica, asbestos, clay, pumice and animal and vegetable charcoals). At the end of the reaction, the catalyst may be recovered by the usual methods and recycled to a subsequent operation.

Regardless of the metal derivative used as the catalyst, a Brönsted acid such as HCl, HF, $H_2SO_4$, $H_3PO_4$ or a sulphonic acid may simultaneously be used. The amount employed may vary within a wide range but it is generally not necessary to exceed 0.5 mol of acid equivalent per mol of substituting compound.

Carrying out the reaction does not demand special precautions except in the case where the substituting compound is an alcohol: an internal dehydration of the alcohol molecule with the formation of an olefine, or a dehydration between two alcohol molecules resulting in the production of an ether may occur. In order to avoid such side-reactions (the extent of which depends on the alcohol), it is desirable to avoid bringing large amounts of the latter into contact with the catalyst at the reaction temperaure. Various means may be employed for this, such as the gradual addition of the alcohol to the aromatic compound containing the catalyst, kept at the selected temperature. It is also possible to dilute the alcohol to be added, with a solvent which may preferably be the aromatic compound.

Generally, the reaction may be carried out in a solvent chosen having regard to the reagents brought together. While this solvent may consist of an excess of one of the reagents, it is also possible to employ inert or relatively inert solvents, taking into account the speed of reaction of the reagents. Among the solvents which are very suitable chlorobenzene, bromobenzene, carbon disulphide, the lower saturated aliphatic acids, for example acetic acid, the nitroalkanes, such as nitromethane or nitroethane, nitrobenzene and dimethylsulphoxide may be used.

The molar ratio of aromatic compound/substituting compound used depends on the reactivity of each of the reagents, and a high reactivity of one or other of the reagents can lead to side-reactions. A few simple experiments make it possible to determine the suitable proportions of reagents in each particular case.

The temperature at which the reaction is carried out may vary within a wide range depending on the reagents used. The reaction can generally be effected at between 20° and 500° C. and preferably between 50° and 300° C. Superatmospheric pressure may also be employed.

Depending on the reagents employed, the process can be carried out in the liquid or vapour phase.

The following Examples illustrate the invention.

EXAMPLE 1

The apparatus used consisted of a 100 cm.³ round 3-necked flask equipped with a dip tube, gas inlet, a reflux condenser, a dropping funnel, a thermometer and an oil bath. The reflux condenser was connected to a conical 125 cm.³ flask equipped with a dropping funnel containing a 1N aqueous solution of sodium hydroxide. The conical flask contained water and a tube connecting it to the condenser opens into the aqueous layer. The contents of the round flask and of the conical flask were stirred with a magnetic stirrer.

44.2 g. of toluene (0.48 mol) and 0.322 g. of ruthenium chloride, obtained according to the method of K. D. Hyde et al.; J. Less Common Metals, 8, 428 (1965) by chlorination of ruthenium at a temperature above 450° C., and exhibiting the X-ray characteristics of the $\alpha$ crystalline form, were introduced into the round flask. 15.8 g. (0.125 mol) of benzyl chloride were introduced into the dropping funnel, and a stream of hydrogen chloride gas was then passed into the toluene, heated to the reflux temperature for about 15 minutes at a rate of $0.1 \times 10^{-2}$ mol/minute under normal conditions of pressure and temperature. Thereafter, the benzyl chloride was gradually introduced into the flask over the course of 5 hours, after having replaced the stream of hydrogen chloride by a slight stream of nitrogen. The mixture was kept under these conditions for 1 hour and then cooled, and the residual hydrogen chloride was driven off by a strong stream of nitrogen. The reaction mixture was then filtered to remove the ruthenium chloride, and the filtrate was thereafter washed with a 1N aqueous solution of sodium bicarbonate until neutral.

After distillation at a reduced pressure of 0.2 mm. Hg, 13.4 g. of a product of refractive index $n_D^{20} = 1.5715$ were obtained, which was identified by IR, N.M.R., and mass spectrometry as being a mixture of o- and p-benzyltoluene. 2.1 g. of dibenzyltoluene, identified in the same manner, and 2.1 g. of a residue, were also obtained. All the benzyl chloride had been converted.

0.109 mol of hydrogen chloride was found in the conical flask.

EXAMPLE 2

The procedure of Example 1 was followed, with the following amounts of reagents:

| | G. |
|---|---|
| Cyclohexyl chloride | 30 |
| Toluene | 23 |
| $\alpha$-$RuCl_3$ | 0.604 |

The cyclohexyl chloride was run in over 2 hours 40 minutes and the reaction mixture was then kept under reflux for 7½ hours.

Distillation yields:

6.2 g. of cyclohexyl chloride
2 g. of cyclohexene
1.1 g. of o- and p-cyclohexyltoluene.

Furthermore, 0.052 mol of hydrogen chloride was found in the conical flask.

EXAMPLE 3

The following reagents were introduced into the apparatus described in Example 1:

| | G. |
|---|---|
| Benzoyl chloride | 17.6 |
| Toluene | 46 |
| $\alpha$-$RuCl_3$ | 0.354 |

The benzoyl chloride was run in over 45 minutes and the reaction mixture was kept at the reflux temperature (118° C.) for 4 hours 40 minutes. 0.025 mol of hydrogen chloride was found in the conical flask.

After removing the toluene and the benzoyl chloride by distillation at ordinary pressure, 1.7 g. of phenyltolyl ketone were obtained by distillation under a reduced pressure of 0.07 mm. Hg. In total, 3.28 g. of benzoyl chloride were converted.

EXAMPLE 4

The procedure of Example 1 was followed but without introducing the stream of hydrogen chloride into the flask, and using the following amounts of reagents:

| | |
|---|---|
| Benzyl chloride | 15.8 |
| Toluene | 46 |
| α-RuCl$_3$ | 0.207 |

The benzyl chloride was added in 7 hours 30 minutes and the reaction mixture was kept under reflux (109–113° C.) for 22 hours 40 minutes. At the end of the reaction, 0.074 mol of hydrogen chloride was found.

After removing the ruthenium chloride and distilling the filtrate, the following were obtained:

3.2 g. of unconverted benzyl chloride
10.7 g. of a mixture of o- and p-benzyltoluene
2.4 g. of dibenzyltoluene.

EXAMPLE 5

The procedure of the preceding Example was followed, replacing the toluene by 19.5 g. of benzene. The benzyl chloride (15.8 g.) was introduced into the flask in solution in 19.5 g. of benzene over 7 hours 50 minutes and the reaction system was maintained under reflux (80–85° C.) for 8 hours. After removing the catalyst and distilling the filtrate, the following were obtained:

4.27 g. of diphenylmethane
3.4 g. of o- and p-bis-benzylbenzine
2 g. of unconverted benzyl chloride
0.081 mol of hydrogen chloride was found in the conical flask.

EXAMPLE 6

The procedure of Example 1 was followed, replacing the α-ruthenium chloride by 0.208 g. of ruthenium chloride obtained by chlorination of ruthenium at a temperature below 350° C. (cf. K. R. Hyde et al., J. Less Common Metals 8, 428 [1965]), and showing the X-ray characteristics of the β-crystalline form.

After distillation, 11.8 g. of unconverted benzyl chloride and 4.5 g. of a mixture of o- and p-benzyltoluene were obtained.

The amount of hydrogen chloride found in the conical flask was 0.05 mol.

If the β-RuCl$_3$ was replaced by ruthenium chloride trihydrate, the system otherwise being the same, 12 g. of unconverted benzyl chloride and 3.35 g. of a mixture of o- and p-benzyltoluene were obtained after distillation. 0.05 mol of hydrogen chloride was found in the conical flask.

EXAMPLE 7

The process was carried out in the apparatus described in Example 1, with the following reagents being introduced:

| | G. |
|---|---|
| Phenol | 20 |
| α-(Chloromethyl)naphthalene | 2.8 |
| α-RuCl$_3$ | 0.0282 |

The α-(chloromethyl)naphthalene was added over the course of 1 hour 5 minutes to the phenol heated to 133–145° C., after which the contents of the flask were kept at this temperature for 3 hours 35 minutes. After distillation the following were obtained:

0.7 g. of α-(chloromethyl)naphthalene
17.1 g. of phenol
2.45 g. of a mixture of o- and p-hydroxybenzyl naphthalene.

EXAMPLE 8

The procedure of Example 4 was followed, replacing the ruthenium chloride by 0.328 g. of osmium chloride trihydrate. The benzyl chloride was added in 4 hours 45 minutes and the contents of the flask were kept under reflux for 23 hours. After separating off the catalyst, the filtrate was distilled. The following were obtained:

2.94 g. of unconverted benzyl chloride
10.7 g. of a mixture of o- and p-benzyltoluene
2.58 g. of dibenzyltoluene
0.078 mol of hydrogen chloride were found in the conical flask.

EXAMPLE 9

The procedure of the preceding Example was followed, replacing the osmium trichloride by 0.328 g. of rhodium trichloride. The benzyl chloride was added over the course of 5½ hours and the contents of the flask were kept under reflux for 7 hours 10 minutes. After distillation, the following were obtained:

0.6 g. of unconverted benzyl chloride
12.2 g. of a mixture of o- and p-benzyltoluene
3.5 g. of dibenzyltoluene.

The amount of hydrogen chloride evolved during the reaction was 0.09 mol.

EXAMPLE 10

The procedure of Example 1 was followed, replacing the toluene by 0.5 mol (53 g.) of p-xylene and the ruthenium chloride by 0.299 g. of tris(propionitrile)trichlororuthenium. The benzyl chloride was added over the course of 45 minutes and the contents of the flask were kept under reflux (130–135° C.) for 22 hours.

After distillation, the following were obtained:

45.9 g. of unconverted p-xylene
9.1 g. of unconverted benzyl chloride
5.85 g. of benzylxylene.

At the end of the reaction, 0.06 mol of hydrogen chloride was found in the conical flask.

EXAMPLE 11

The procedure of Example 1 was followed, replacing the toluene by 64 g. of naphthalene, in the presence of 0.208 g. of α-ruthenium chloride. The benzyl chloride was added over the course of 2 hours and the contents of the flask were kept at 140° C. for 2½ hours. After distillation, 15.3 g. of a mixture of α- and β-benzylnaphthalene were obtained. All the benzyl chloride had been converted. 0.116 mol of hydrogen chloride was found in the conical flask.

EXAMPLE 12

The apparatus of Example 1 was used, modified by replacing the dropping funnel by a two-necked flask with one neck connected to an inert gas dip tube inlet and the other connected to the reaction flask by a tube dipping into the contents of the latter. The conical flask was connected to a trap cooled by means of solid carbon dioxide.

53 g. of ethylbenzene and 0.208 g. of α-ruthenium chloride were introduced into the reaction flask. 38.7 g. of t-butyl chloride were introduced into the second flask. The contents of the reaction flask were heated under reflux at the same time as the t-butyl chloride was carried over into the ethylbenzene by a stream of nitrogen over the course of 6½ hours. As in Example 1, hydrogen chloride gas was introduced over the course of 15 minutes at a flow rate of 0.16×10$^{-2}$ mol/minute. At the end of the reaction, 0.230 mol of hydrogen chloride was found in the conical flask.

After distillation of the reaction mixture, 2.4 g. of p-t-butylethylbenzene were obtained.

EXAMPLE 13

60 g. of isopropylbenzene and 0.208 g. of α-ruthenium chloride were introduced into the reaction flask of the apparatus described in the Example 12. The mixture was heated to refluxing and 38.3 g. of allyl chloride were then introduced over the course of 23½ hours in accordance with the technique employed in Example 12. At the end of the reaction, 0.053 mol of hydrogen chloride was found in the conical flask. After distillation, 53.6 g. of isopropylbenzene and 1.6 g. of a mixture of *o-* and *p*-allylisopropylbenzene were recovered. 11.2 g. of unconverted allyl chloride were collected in the trap.

EXAMPLE 14

The procedure of Example 4 was followed, replacing the ruthenium chloride by 0.302 g. ($10^{-3}$ mol) of iridium chloride ($IrCl_3$). The benzyl chloride (15.8 g.) was added to the toluene (46 g.), heated to refluxing, over the course of 2 hours 35 minutes.

At the end of the reaction 0.011 mol of hydrogen chloride was found in the conical flask. After distillation of the reaction mixture, 11.4 g. of unconverted benzyl chloride and 1.85 g. of a mixture of *o-* and *p*-benzyltoluene were obtained.

EXAMPLE 15

The procedure of Example 1 was applied to the following amounts of reagents:

Phenol _____ 47 g.
2-bromobutane _____ 17.1 g., added over the course of 3 hours 10 minutes.
α-$RuCl_3$ _____ 0.216 g.

The reaction mixture was kept at 130° C. for 5 hours 45 minutes after the end of the addition. 0.135 mol of hydrogen bromide was found in the conical flask.

After distillation, 41.7 g. of phenol and 10.8 g. of a mixture of *o-* and *p*-2-butylphenol were obtained.

EXAMPLE 16

The apparatus described in Example 12 was used, modified in that it comprised two reaction flasks arranged in series, the condenser of the first being connected to the second flask by a dip tube.

The following were introduced into each reaction flask:

Anisole _____ 54 g.
α-$RuCl_3$ _____ 0.104 g.
HCl _____ $1.5 \times 10^{-3}$ mol (introduced as in Example 1).

Acetyl chloride (22 g.) was introduced into the first flask, and was carried over into the reaction flasks by a stream nitrogen over the course of 6 hours 20 minutes. The contents of the reaction flasks were kept at 122°–130° C. After distillation, 88.6 g. of unconverted anisole and 12 g. of *p*-methoxyacetophenone were recovered.

EXAMPLE 17

The procedure of the preceding Example was followed, replacing the ruthenium chloride by 0.210 g. of $RhCl_3$, working in the absence of HCl and continuing the heating for 7 hours at 124° C. after the end of the addition of the acetyl chloride.

After distillation, 46.2 g. of anisole and 0.88 g. of *p*-methoxyacetophenone were obtained.

On replacing $RhCl_3$ by $OsCl_3.3H_2O$ (0.335 g.), 2.05 g. of *p*-methoxyacetophenone were obtained.

EXAMPLE 18

The procedure of Example 17 was followed, replacing the acetyl chloride by allyl chloride (21.5 g.) and $RhCl_3$ by 211.3 mg. of α-$RuCl_3$. Heating was continued for 8 hours after the end of the addition of the allyl chloride.

At the end of the reaction, 0.07 mol of acid was found in the conical flask. After distillation, 5.8 g. of *o-* and *p*-allylanisole were obtained.

EXAMPLE 19

The apparatus used consisted of a 100 cm.³ flask equipped with a dropping funnel, an azeotropic distillation device, a dip tube for introducing gas, a heating device and a magnetic stirring system.

78 g. of benzene, 0.207 g. of β-ruthenium chloride and $2 \times 10^{-2}$ mol of hydrogen chloride were introduced into the flask. Thereafter the contents of the flask were heated to 80° C., and then a solution of 26.05 g. of benzyl alcohol in 35 cm.³ of benzene was introduced dropwise with the dropping funnel. The addition lasts 7 hours; heating was continued for 30 minutes after the end of the addition, and the reaction mixture was then cooled. The contents of the flask were extracted with 100 cm.³ of ethyl acetate and the extract was then washed with N/10 sodium hydroxide solution until neutral. Thereafter the ethyl acetate was removed by distillation under normal pressure, and the residue was then distilled under a pressure reduced to 0.2 mm. Hg. 20.2 g. of diphenylmethane, 5.8 g. of dibenzylbenzene and 5.45 g. of a residue were thus isolated. All the benzyl alcohol had been converted.

EXAMPLE 20

The apparatus used was identical to that described in Example 19, but the flask capacity was increased to 500 cm.³.

The procedure of Example 19 was adopted, reacting the following quantities of reagent under the following conditions:

benzene—200 cm.³
$OsCl_3$—0.150 g.
26.05 g. of benzyl alcohol dissolved in 105 cm.³ of benzene
HCl—$10^{-2}$ mol
total duration of the operation 7¼ hours duration of addition of the benzyl alcohol: 6¾ hours After cooling to 20° C., the catalyst was allowed to separate out and the liquid phase was then withdrawn and distilled. 24 g. of diphenylmethane, 5.3 g. of dibenzylbenzene and 4.2 g. of a residue were thus obtained. All the alcohol had been converted.

225 cm.³ of benzene were introduced into the flask previously used and containing the catalyst of the preceding operation, and a solution of 17.4 g. of benzyl alcohol in 60 cm.³ of benzene was added over the course of 2½ hours. Heating was continued for 2½ hours and the reaction mixture was then treated as before; in this way, the following mixture was obtained:

14.44 g. of diphenylmethane
2.6 g. of dibenzylbenzene
0.96 g. of unconverted benzyl alcohol
3.2 g. of residue.

EXAMPLE 21

The process was carried out in the apparatus described in Example 12. 1.039 g. of α-$RuCl^3$ ($5 \times 10^{-3}$ mol), 69 g. of guaiethol and 20 cm.³ of chlorobenzene as the solvent were introduced into the reaction flask. The mixture was heated to 133°–139° C. and 40.5 cm.³ of allyl chloride were then introduced. Thereafter the mixture was kept at this temperature for 7½ hours. In total, 0.0605 mol of hydrogen chloride had been evolved.

The reaction mixture was distilled *in vacuo* after removing chlorobenzene by distillation under normal pressure and ruthenium chloride by filtration. A fraction (9.3 g.) of boiling range 68°–82° C. under 0.03 mm. Hg is isolated, and in this the following were found by chromatography:

45% of 2-ethoxy-4-allylphenol
45% of 2-ethoxy-5-allylphenol
10% of 2-ethoxy-6-allylphenol.

Furthermore, 54 g. of a fraction passing over between 33° and 65° C. under 0.03 mm. Hg. 0.8 g. of a fraction passing over between 135 and 185° C., and 1.7 g. of residue were obtained.

EXAMPLE 22

The allylation of guaiacol was carried out in the apparatus of Example 12, under the following conditions and with the following results:

| | |
|---|---|
| α-RuCl$_3$ | 1.04 g. (5×10$^{-3}$ mol). |
| Guaiacol | 62 g. (0.5 mol). |
| Chlorobenzene | 20 cm.$^3$. |
| Allyl chloride | 40.5 cm.$^3$. |
| Temperature | 145°–150° C. |
| Duration | 7½ hours. |
| HCl evolved | 0.0462 mol. |
| Chlorobenzene recovered | 20 cm.$^3$. |
| Guaiacol recovered | 55.7 g. |

After distillation of the reaction mixture under a pressure of 0.02 mm. Hg. 4 g. of a fraction containing 55% of eugenol, 35% of chavibetol and 10% of 1-methoxy-6-allylphenol were obtained.

EXAMPLE 23

The process was carried out with the apparatus described in Example 12, under the following conditions:

| | |
|---|---|
| α-RuCl$_3$ | 104.8 mg. (5×10$^{-4}$ mol). |
| CH$_3$COOH | 25 cm.$^3$. |
| Phenol | 23.5 g. (0.25 mol). |
| Allyl chloride | 38.3 g. (0.25 mol). |
| Temperature | 95–130° C. |
| Duration | 7 hours 40 minutes. |
| HCl evolved | 0.0112 mol. |

Distillation of the reaction mixture under a pressure of 18 mm. Hg yields 1 g. of a fraction distilling between 98° and 120° C. in which 15% of o-allylphenol, 30% of p-allylphenol and 55% of 2-methyl-2,3-dihydrobenzofurane were isolated.

EXAMPLE 24

The process was carried out as in Example 23, under the following conditions:

| | |
|---|---|
| α-RuCl$_3$ | 1.0099 g. (5×10$^{-3}$ mol). |
| 1,2,4-trimethoxybenzene | 50 g. (0.24 mol). |
| Allyl chloride | 124 cm.$^3$. |
| Temperature | 92°–170° C. |
| Duration | 15 hours 35 minutes. |
| HCl evolved | 0.047 mol. |

Distillation under a pressure of 0.01 mm. Hg yields 2.3 g. of a fraction distilling between 108° and 125° C. and consisting principally of 1,2,4-trimethoxy-5-allylbenzene and 25.2 g. of a fraction passing over between 131 and 210° C.

EXAMPLE 25

Using the apparatus described in Example 12, the t-butylation of biphenyl is carried out under the following conditions:

| | |
|---|---|
| α-RuCl$_3$ | 208 mg. (10$^{-3}$ mol). |
| Biphenyl | 386. g. (0.25 mol). |
| t-Butyl chloride | 55 cm.$^3$ (0.25 mol). |
| Temperature | 137°–152° C. |
| Duration | 7½ hours. |
| HCl evolved | 0.094 mol. |

Distillation under a pressure of 0.15 mm. Hg yields 34.6 g. of biphenyl and 3.3 g. of a fraction distilling between 142° and 180° C. and consisting of 90% by weight of p-t-butylbiphenyl.

EXAMPLE 26

The cyclohexylation of phenol was carried out in the apparatus described in Example 12, under the following conditions:

| | |
|---|---|
| α-RuCl$_3$ | 105.5 mg. (5×10$^{-4}$ mol). |
| Phenol | 47 g. (0.25 mol). |
| Cyclohexyl chloride | 59.3 g. (0.25 mol). |
| Temperature | 145°–157° C. |
| Duration | 7¾ hours. |
| HCl evolved | 0.427 mol. |

Distillation under a reduced pressure of 0.6 mm. Hg yields the following fractions:

31.5 g. distilling between 53° and 95° C. and consisting of phenol and cyclohexyl chloride, 24.6 g. distilling between 98° and 113° C. and consisting of o- and p-cyclohexylphenol, 17 g. distilling between 126° and 170° C. and consisting of 2,4-dicyclohexylphenol, and 3.4 g. of residue.

EXAMPLE 27

The following reagents were introduced into the apparatus described in Example 1:

| | |
|---|---|
| 1,2-methylenedioxybenzene | 25 g. |
| Piperonyl chloride | 3.4 g. (2×10$^{-2}$ mol). |
| α-RuCl$_3$ | 10.8 mg. |

Thereafter the whole was heated for 8 hours at 12° C. The reaction mixture was cooled and then filtered, and a precipitate weighing 3.3 g., having a melting point of 149° C., and consisting of bis(1,2-methylenedioxyphenyl)methane was isolated. Distillation of the filtrate yielded 17.5 g. of 1,2-methylenedioxybenzene. All the piperonyl chloride had been converted.

EXAMPLE 28

The following were introduced into the apparatus described in Example 1:

| | |
|---|---|
| α-RuCl$_3$ | 142 mg. (1.3×10$^{-3}$ mol). |
| 1,4-bis(chloromethyl)benzene | 5.75 g. |
| 1,3,5-trimethylbenzene | 78 g. |

The mixture was heated for 6 hours at 120° C. and the trimethylbenzene was then removed by distillation. A residue was obtained and recrystallised from alcohol. In this way 7.5 g. of a product of melting point 178° C., identified as being the product of formula:

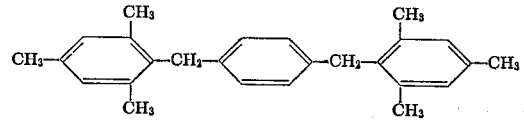

were obtained.

EXAMPLE 29

The following were introduced into the apparatus described in Example 1:

| | |
|---|---|
| α-RuCl$_3$ | 208 mg. (10$^{-3}$ mol). |
| Thiophene | 84.13 g. (1 mol). |
| Acetyl chloride | 58 cm.$^3$ (0.75 mol). |

The reaction mixture was thereafter heated at 80° C. for 6¾ hours and then distilled under a reduced pressure of 18 mm. Hg. 5 g. of a fraction distilling between 85° and 120° C. and consisting of 90% by weight of 2-acetyl-thiophene were obtained.

EXAMPLE 30

Veratrole was acetylated in the apparatus described in Example 12, under the following conditions:

| | |
|---|---|
| α-RuCl$_3$ | 208.8 mg. ($10^{-3}$ mol). |
| Veratrole | 69 g. (0.5 mol). |
| CH$_3$COCl | 71 cm.$^3$ (1 mol). |
| Temperature | 135°–154° C. |
| Duration | 6½ hours. |
| HCl evolved | 0.283 mol. |

Distillation under a reduced pressure of 0.015 mm. Hg yielded the following fractions:

56.9 distilling between 42° and 83° C. and consisting of veratrole, 15.4 g. distilling between 100° and 115° C. and consisting of 97% of acetylveratrole (1,2-dimethoxy-4-acetylbenzene) of melting point 50°–51° C.

25.2 g. of acetyl chloride were converted.

EXAMPLE 31

The benzoylation of anisole was carried out in the apparatus described in Example 1, under the following conditions:

| | |
|---|---|
| α-RuCl$_3$ | 211.4 mg. ($10^{-3}$ mol). |
| Anisole | 54 g. (0.5 mol). |
| Benzol chloride | 17.6 g. |
| Temperature | 130°–158° C. |
| Duration | 23 hours 20 minutes. |
| HCl evolved | 0.115 mol. |

Distillation of the reaction mixture under a reduced pressure of 0.03 mm. Hg yielded the following fractions:

25.4 g. of anisole 24.5 g. of a product distilling between 157° and 162° C. and consisting of 11% of benzoyl chloride, 3.5% of anisole and 85.5% of p-benzoylanisole.

85% of the benzoyl chloride had been converted.

EXAMPLE 32

Anisole was acetylated in a tantalum autoclave under the following conditions:

| | |
|---|---|
| α-RuCl$_3$ | 540 mg. ($2.5 \times 10^{-3}$ mol). |
| Anisole | 216 g. (2 mols). |
| Acetic anhydride | 102 g. (1 mol). |
| Concentrated HCl | 1 cm.$^3$. |
| Temperature | 130° C. |
| Duration | 3 hours 10 minutes under autogenous pressure. |

After removal of the anisole and the acetic anhydride, 7.1 g. of a product distilling between 85° and 100° C. under a reduced pressure of 1 mm. Hg and consisting of p-acetylanisole were isolated.

I claim:

1. In a process for the preparation of a substituted aromatic compound by reacting an aromatic compound containing at least one hydrogen atom attached to an aromatic nucleus and of the formula:

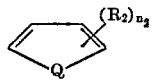

in which Q is —CH=CH—, —CH=N—, —NH—, —S— or —O—, $n_2$ is 0 or a whole number from 1 to 5 having a maximum value lower than the total number of carbon atoms in the ring, and R$_2$ is alkyl of 1 to 10 carbon atoms, aralkyl of 7 to 20 carbon atoms, alkenyl of 2 to 10 carbon atoms, cyclohexyl, cyclohexenyl, hydroxyalkyl, alkoxy-alkyl, cycloalkoxy-alkyl, cycloalkenyloxy-alkyl, aryloxyalkyl, hydroxy, alkoxy, cycloalkoxy, aryloxy, alkenyloxy or aryl, or two substituents R$_2$ represent either a hydrocarbon chain forming a benzene nucleus with two adjacent carbon atoms of the substituted nucleus or a methylenedioxy group; and when $n_2$ is greater than 1 the several R$_2$ radicals may be identical or different, with an aliphatic, cycloaliphatic or araliphatic halide, an aliphatic, cycloaliphatic or araliphatic primary or secondary alcohol, a carboxylic acyl halide, or a carboxylic acid anhydride in the presence of a Friedel-Crafts catalyst, to introduce an aliphatic, cycloaliphatic, araliphatic or carboxylic acyl substituent into said aromatic compound, the improvement which consists in using, as the said catalyst, a halide of ruthenium, rhodium, or osmium.

2. The improvement of Claim 1 in which a Brönsted acid is simultaneously used as catalyst with the ruthenium, rhodium, and osmium halide.

3. The improvement of claim 1, in which R$_2$ is alkyl of 1 to 10 carbon atoms, aralkyl of 7 to 20 carbon atoms, alkenyl of 2 to 10 carbon atoms, cyclohexyl or cyclohexenyl; hydroxyalkyl, alkoxy-, cycloalkoxy-, cycloalkenyloxy, or aryloxy-alkyl, alkoxy, cycloalkoxy, aryloxy, alkenyloxy, or aryl.

4. The improvement of claim 1, in which the halide, alcohol, or acid anhydride is of the formula:

R$_1$—X; or
R$_1$—OH (R$_1$ not being carboxylic acyl); or
(R$_1$)$_2$O (R$_1$ being carboxylic acyl)

in which X represents halogen and R$_1$ represents an aliphatic, cycloaliphatic or araliphatic hydrocarbyl radical or an carboxylic acyl radical each of which may be substituted by chlorine, bromine, nitrile, amino, nitro, nitroso.

5. The improvement of claim 4, in which R$_1$ is alkyl of 1 to 10 carbon atoms, aralkyl of 7 to 20 carbon atoms, alkenyl of 2 to 10 carbon atoms, cyclohexyl or cyclohexenyl, hydroxyalkyl, alkoxy-, cycloalkoxy-, cycloalkenyloxy-, or aryloxy-alkyl, carboxylic acyl.

6. The improvement of claim 1, in which the catalyst is α-RuCl$_3$, β-RuCl$_3$, RuCl$_3 \cdot 3$H$_2$O, OsCl$_3 \cdot 3$H$_2$O, RhCl$_3$, RuCl$_3$(NCC$_2$H$_5$)$_3$, or OsCl$_3$.

7. The improvement of claim 1, effected at a temperature between 50° C. and 300° C.

8. The improvement of claim 1, in which $10^{-4}$ to $5 \times 10^{-1}$ mol of ruthenium, rhodium, or osmium halide per mol of halide, alcohol or acid anhydride is used.

9. A process for the preparation of an aromatic compound selected from the class consisting of benzene, toluene, ethylbenzene, xylenes, isopropylbenzene, allylbenzene, trimethylbenzenes, naphthalene, biphenyl, phenol, cresols, pyrocatechol, guaiacol, guaiethol, anisole, phenetole, dimethoxybenzenes, trimethoxybenzenes, allyloxybenzene, 1,2-methylenedioxybenzene and thiophene, substituted by alkyl of 1 to 4 carbon atoms, alkenyl of 3 to 4 carbon atoms, cyclohexyl, benzyl, alkanoyl of 2 to 4 carbon atoms, piperonyl, naphthalenemethyl or benzoyl, which comprises contacting an aromatic compound as aforesaid with a substituting compound selected from the class consisting of alkyl halides of 1 to 4 carbon atoms, alkenyl halides of 3 to 4 carbon atoms, cyclohexyl halides, benzyl halides, alkanoyl halides of 2 to 4 carbon atoms, anhydrides of alkanoic acids of 2 to 4 carbon atoms, piperonyl halides, naphthalenemethyl halides and benzoyl halides, at 50° to 300° C., in the presence of a catalyst selected from the class consisting of halides of ruthenium, osmium, and rhodium, RuCl$_3$(NCC$_2$H$_5$)$_3$, dichloro-tetrakis(acrylonitrilo)ruthenium, dichloro-tetrakis(methacrylonitrilo)ruthenium, diiodo-tetrakis(acrylonitrilo)ruthenium, dichloro-tetrakis(benzonitrilo)ruthenium, and trichloro-tris(acetonitrilo)ruthenium in a proportion of $10^{-4}$ to $5 \times 10^{-1}$ mol of said catalyst per mol of substituting compound.

10. A process for the preparation of a substituted aromatic compound wherein an aromatic compound selected from the class consisting of benzene, toluene, ethylbenzene, xylenes, isopropylbenzene, allylbenzene, trimethylbenzenes, naphthalene, biphenyl, phenol, cresols, pyrocatechol, guaiacol, guaiethol, anisole, phenetole, dimethoxybenzenes, trimethoxybenzenes, allyloxybenzene, 1,2-methylenedioxybenzene and thiophene is contacted with a substituting compound selected from the class consisting of methyl halides, ethyl halides, propyl halides, isopropyl halides, n-butyl halides, sec-butyl halides, tert-butyl halides, benzyl halides, phenylethyl halides, naphthylmethyl halides, bis(halomethyl)benzenes, piperonyl halides, vinyl halides, allyl halides, propenyl halides, butenyl halides, cyclohexyl halides, cyclohexenyl halides, hydroxyethyl halides, hydroxypropyl halides, hydroxybutyl halides, ethoxyethyl halides, propoxyethyl halides, vinyloxyethyl halides, allyloxyethyl halides, ethanol, propanol, cyclohexanol, benzyl alcohol, β-phenylethyl alcohol, methoxyethanol, ethoxyethanol, allyloxyethanol, acetyl halides, propionyl halides, butyryl halides, acrylyl halides, methacrylyl halides, benzoyl halides, toluyl halides, acetic anhydride, propionic anhydride and benzoic anhydride at 50° to 300° C., in the presence of a catalyst selected from the class consisting of halides of ruthenium, osmium, and rhodium, $RuCl_3(NCC_2H_5)_3$, dichloro-tetrakis(acrylonitrilo)ruthenium, dichloro-tetrakis(methacrylonitrilo)ruthenium, diiodo-tetrakis(acrylonitrilo)ruthenium, dichloro-tetrakis(benzonitrilo)ruthenium, and trichloro-tris(acetonitrilo)ruthenium in a proportion of $10^{-4}$ to $5 \times 10^{-1}$ mol of said catalyst per mol of substituting compound, whereby an organic substituent derived from said substituting compound is introduced into said organic compound.

11. A process for the preparation of toluene substituted by benzyl which comprises contacting toluene with benzyl chloride at 50° to 300° C. in the presence of ruthenium chloride as catalyst in a proportion of $10^{-4}$ to $5 \times 10^{-5}$ mol of said catalyst per mol of substituting compound.

References Cited

FOREIGN PATENTS 421,118 12/1934 Great Britain.
1,505,334 11/1967 France.

OTHER REFERENCES

Olah: Friedel-Crafts and Related Reactions, vol. I (Interscience, N.Y., 1963), pp. 201–2, 281–2, 290–4.

Morrison et al.: Org. Chem. (Allyn & Bacon, Boston, 1959), pp. 298–9.

HENRY R. JILES, Primary Examiner

C. M. S. JAISLE, Assistant Examiner

U.S. Cl. X.R.

260—283 R, 283 CN, 287 R, 288 R, 289 R, 290 R, 290 V, 290 HL, 294.9, 295 R, 295 AM, 295.5 R, 295.5 A, 296 R, 297 R, 313.1, 319.1, 326.13 R, 326.14 R, 326.16, 326.2, 326.47, 326.5 J, 326.5 L, 326.5 R 326.62, 329 R, 329 AM, 330.5 332.2 A, 332.2 R, 332.3 R, 332.3 C, 332.5, 332.8, 340.5, 340.9, 346.2 R, 347.3, 347.4, 347.8, 346.1 R, 465 D, 465 E, 465 F, 465 H, 465 G, 465 K, 465 R, 471 R, 473 R, 476 R, 479 R, 482 R, 483, 484 R, 486 H, 486 R, 487, 488 R, 469, 478, 558 R, 561 R, 562 R, 568, 571, 574, 590, 591, 592, 594, 599, 611 A, 612 R, 612 D, 613 R, 613 D, 619 R, 618 R, 618 D, 620, 621 R, 622 R, 623 R, 624 R, 624 B, 625, 626 R, 626 T, 671 A, 671 B, 671 C